(12) United States Patent
Dent

(10) Patent No.: US 7,072,382 B2
(45) Date of Patent: Jul. 4, 2006

(54) MULTIPLE BIT COMPLEX BIT MODULATION

(75) Inventor: Peter R. Dent, Irthlingborough (GB)

(73) Assignee: Texas Instruments Incorporated, Dallas, TX (US)

( * ) Notice: Subject to any disclaimer, the term of this patent is extended or adjusted under 35 U.S.C. 154(b) by 803 days.

(21) Appl. No.: 10/135,658

(22) Filed: Apr. 29, 2002

(65) Prior Publication Data

US 2003/0099283 A1    May 29, 2003

(30) Foreign Application Priority Data

Nov. 12, 2001    (EP)    .................................. 01309544

(51) Int. Cl.
  *H04B 1/69*    (2006.01)
  *H04L 27/06*    (2006.01)
(52) U.S. Cl. ........................................ 375/146; 375/316
(58) Field of Classification Search ................ 375/146, 375/316, 149, 150, 130, 366, 152; 370/342, 370/335
See application file for complete search history.

(56) References Cited

U.S. PATENT DOCUMENTS 3,678,469 A * 7/1972 Freeman et al. ............ 714/779

5,848,096 A * 12/1998 Shou et al. .................. 375/147
6,594,324 B1 * 7/2003 Watanabe et al. ........... 375/343
6,781,980 B1 * 8/2004 Dajer et al. ................. 370/342

FOREIGN PATENT DOCUMENTS

EP    1 005 202 A    5/2000
GB    2 319 147 A    5/1998

* cited by examiner

*Primary Examiner*—Khai Tran
(74) *Attorney, Agent, or Firm*—Alan K. Stewart; W. James Brady, III; Frederick J. Telecky, Jr.

(57) ABSTRACT

A wireless communications base station (10) having a digital bit modulation function (72) is disclosed. The bit modulation function (72) may be realized by a software routine executable by a programmable device such as a digital signal processor (40), or alternatively by dedicated logic circuitry. The bit modulation function (72) receives a datastream corresponding to the payload, and a scrambling code, each of which include an in-phase component and a quadrature component. The bit modulation function (72) corresponds to a split adder (94) that performs a Gray Code addition of corresponding bits of the in-phase and quadrature data components with corresponding bits of the in-phase and quadrature scrambling code components. The result is a combined in-phase bit and a combined quadrature bit for each bit position in the datastream. The Gray Code addition takes the place of a complex multiplication, thus saving significant processing capacity or reducing circuit complexity.

12 Claims, 3 Drawing Sheets

MULTIPLE BIT COMPLEX BIT MODULATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of wireless communications, and is more specifically directed to the digital modulation of broadband signals in such communications.

The popularity of mobile wireless communications has increased dramatically over recent years. It is expected that this technology will become even more popular in the foreseeable future, both in modern urban settings and also in rural or developing regions that are not well served by line-based telephone systems. This increasing wireless traffic strains the available communications bandwidth for a given level of system infrastructure. As a result, there is substantial interest in increasing bandwidth utilization of wireless communications system to handle this growth in traffic.

Modern digital communications technology utilizes multiple-access techniques to increase bandwidth utilization, and thus to carry more wireless traffic. Under current approaches, both time division multiple access (TDMA) and code division multiple access (CDMA) techniques are used in the art to enable the simultaneous operation of multiple communications conversations, or wireless "connections". For purposes of this description, the term "conversations" refers to either voice communications, data communications, or any type of digital communications. As evident from the name, TDMA communications are performed by the assignment of time slots to each of multiple communications, with each conversation transmitted alternately over short time periods. CDMA technology, on the other hand, permits multiple communications sessions to be transmitted simultaneously in both time and frequency, by modulating the signal with a specified code. On receipt, application of the code will recover the corresponding conversation, to the exclusion of the other simultaneously received conversations.

This trend toward heavier usage of wireless technologies for communications, in combination with the advent of so-called third-generation, or "3G", wireless communications to carry not only voice, but also data, video, and other high data rate payloads, will require continuing improvements in the processing capabilities of the communications equipment. In particular, the higher required data rates will require corresponding increases in the digital processing of the communications payloads.

The process of digital modulation of a signal to be transmitted is of particular importance in the digital processing of broadband, or spread-spectrum signals. As known in the art, conventional wireless transmission is carried out according to quadrature amplitude modulation (QAM), in which each modulated symbol is represented by the combination of an amplitude value and a phase rotation (the phase rotation being relative to a previous symbol). The number of bits in the data symbol being modulated determines the density of the QAM "constellation"; for example, QAM modulation of an eight bit data symbol involves a 256-point QAM constellation, in which 256 combinations of amplitude and phase are used to represent each of the 256 ($2^8$) possible data values.

Each data symbol to be transmitted must therefore be converted into the appropriate amplitude and phase modulation point. According to conventional QAM systems, this modulation is carried out by considering the data value as the combination of an in-phase (I) digital word and a quadrature (Q) digital word. The I and Q values represent the real and imaginary parts of a complex value, so that their combination represents a point in the complex plane, involving both amplitude and phase.

FIG. 1 illustrates the data flow for a transmitting element, such as a wireless handset or base-station, according to conventional techniques. In this broadband example, an input data bitstream has been spread into multiple "chips", as known in the art, such that each bit of the input bitstream consists of a series of samples (the "chips") that are modulated by a spreading code. This spread data stream is represented as in-phase component I(k) and a quadrature component Q(k). As shown in FIG. 1, multiplier 3 effectively shifts each digital word in the sequence of quadrature component Q(k) by 90° (indicated by multiplication by square root of −1, represented in the art as imaginary operator "j"). Adder 2 then combines this phase-shifted quadrature component jQ(k) with its corresponding digital word in the sequence of in-phase component I(k).

The combined I and Q components from adder 2 are then scrambled by a scrambling code c(k) prior to its transmission. As conventional in the cellular telephone art, scrambling code c(k) is cell-specific in the downlink case, in that all transmissions from a central office that take place in the same physical cell use the same scrambling code. Scrambling code c(k) thus allows each remote system element to resolve incoming communications for its cell from those that may be received from other cells. Conversely, in the uplink case, the scrambling code c(k) is user-specific, dedicated to the particular transmitting wireless unit. Typically, scrambling code c(k) is a "long" code, for example 4096 chips in length. According to this conventional example of FIG. 1, the scrambling code c(k) also includes both an in-phase component $I_c(k)$ and a quadrature component $Q_c(k)$. Similarly as for the data bitstream, in-phase scrambling code component $I_c(k)$ is added, by adder 4, with quadrature scrambling code component $Q_c(k)$ after application of a 90° phase-shift by multiplier 5.

In this conventional example, the combined in-phase and quadrature data signal from adder 2 is mixed with the combined in-phase and quadrature scrambling code signal from adder 4, at mixer 6. In the digital context, mixer 6 is a complex multiplier function or circuit. Signal Y(k), at the output of mixer 6, is the complex modulated output of these operations, and includes in-phase and quadrature components. These components are then filtered and used to modulate in-phase (cosine wave) and quadrature (sine wave) analog signals at the appropriate carrier frequency.

The operations of FIG. 1 are conventionally carried out by digital signal processing operations, such as may be carried out by a high performance digital signal processor (DSP), such as the TMS 320c5x or 320c6x families of digital signal processors available from Texas Instruments Incorporated. It has been observed, in connection with the present invention, that the complex multiplication of the data and scrambling codes, shown by mixer 6 in FIG. 1, is a particularly cumbersome operation, whether performed as a software routine by a DSP, or in dedicated logic hardware. It is contemplated that, especially as data rates increase, this operation can be a bottleneck in the transmission of wireless signals.

BRIEF SUMMARY OF THE INVENTION

It is therefore an object of this invention to provide a computationally simple circuit and method for combining a complex data signal with a complex scrambling code.

It is a further object of this invention to provide such a circuit and method that may be implemented either in software or in hardware.

It is a further object of this invention to provide such a circuit and method in which the computations required for combining the data and scrambling code are facilitated without affecting the modulated signal.

Other objects and advantages of the present invention will be apparent to those of ordinary skill in the art having reference to the following specification together with its drawings.

The present invention may be implemented by way of a split adder architecture or operation to combine a complex digital data signal, having real and imaginary parts, with a complex scrambling digital code, also having real and imaginary parts. The split adder performs Gray Code addition of each bit position of the in-phase and the quadrature data components, with the corresponding bits of the in-phase and quadrature scrambling code components. The resulting sum accurately presents the complex multiplication of the data signal and its scrambling code, because the split adder operation includes a −45° phase shift, which is not relevant to the transmission, and a reduction in amplitude by a factor of $1/\sqrt{2}$, which can be readily compensated, if desired.

DETAILED DESCRIPTION OF THE INVENTION

The present invention will be described in connection with a wireless voice and data communications system, such as a wireless telephone base station. It is contemplated, however, that the present invention may also be used with other communications systems, including other types of mobile wireless communications applications, other spread spectrum or broadband technologies, and other applications in the field of digital radio. It is to be understood, therefore, that the following description is presented by way of example only, and is not intended to limit the scope of the present invention as claimed.

Figure 2:
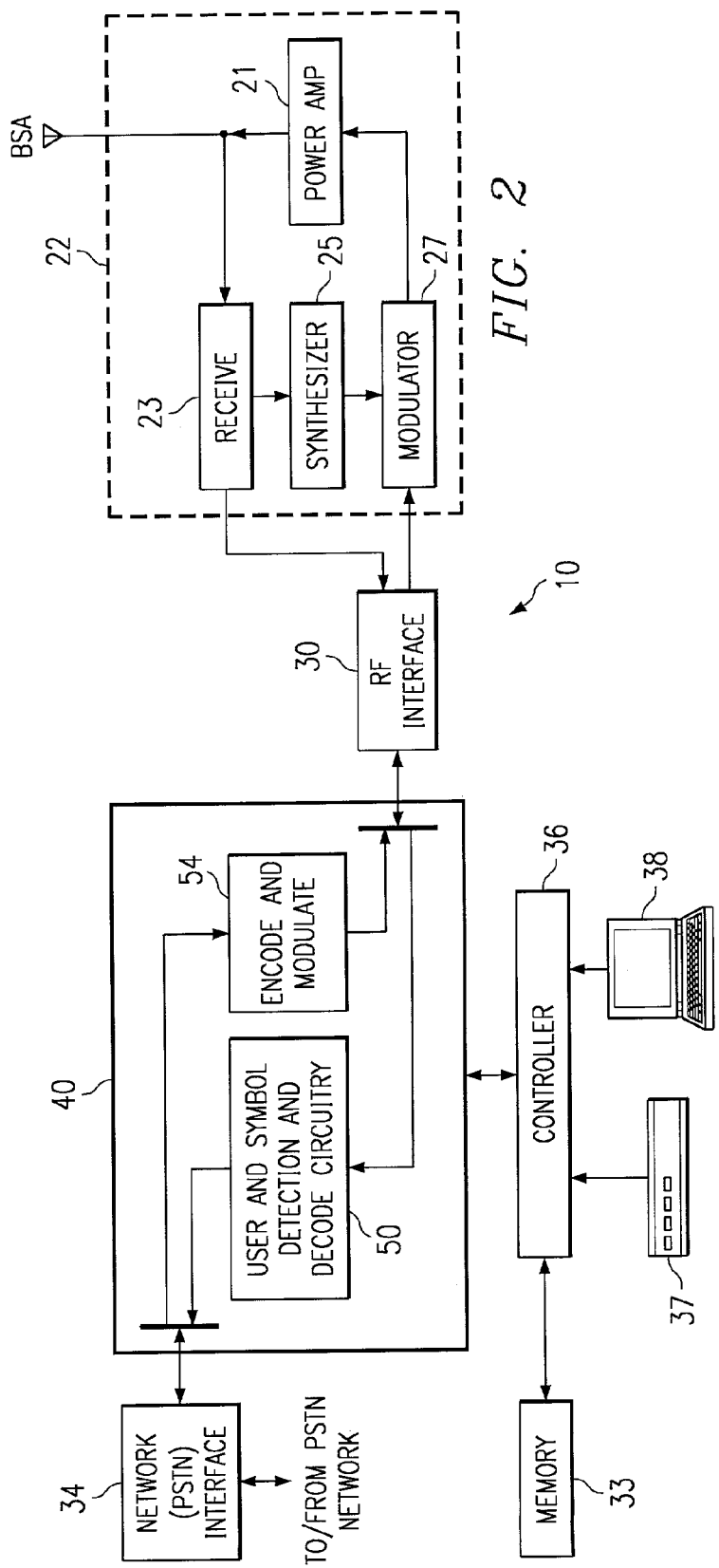
FIG. 2 is an electrical diagram, in block form, of a wireless handset in which the preferred embodiment of the invention is implemented.

Referring now to FIG. 2, wireless base station 10 constructed according to the preferred embodiment of the invention will now be described in detail. Wireless unit 10 of FIG. 2 corresponds to a wireless base station, for example according to at least the so-called "second generation", or "2G" capability, such as is typically used to carry out TDMA and CDMA broadband communication; it is further contemplated that wireless unit 10 may also be constructed to provide the so-called "third generation" or "3G" communications, which include data and video services. Of course, it is contemplated that wireless handsets and other digital radio applications can also benefit from this invention. The architecture of the construction of wireless unit 10 shown in FIG. 2 is provided by way of example only, it being understood that such other alternative architectures may also be used in connection with the present invention.

Radio subsystem 22 of wireless base station 10 is directly connected to base station antenna BSA, and handles the power amplification and analog processing of signals transmitted and received over antenna A. On the transmit side, modulator 27 in radio subsystem 22 receives the signals to be transmitted from RF (radio frequency) interface circuitry 30, and generates a broadband modulated analog signal, under the control of synthesizer 25. Power amplifier 21 amplifies the output of modulator 27 for transmission via antenna BSA. On the receive side, incoming signals from antenna BSA are received by receiver 23, filtered and processed under the control of synthesizer 25, and forwarded to RF interface circuitry 30, which in turn forwards the signals to digital signal processor (DSP) 40.

DSP 40 preferably has a significant amount of processing capacity to handle the digital processing necessary for both the transmit and receive operations. An example of a suitable digital signal processor for use as DSP 40 is the TMS320c6x family of digital signal processors available from Texas Instruments Incorporated, a preferred example of which is the TMS320C6416 DSP RF interface circuitry 30 processes both incoming and outgoing signals within the analog baseband of wireless base station 10. On the transmit side, RF interface circuitry 30 receives digital signals from DSP 40, and performs the appropriate filtering and phase modulation appropriate for the particular transmission protocol. For example, multiple channels of encoded digital bitstreams, corresponding to the combination of both in-phase (I) and quadrature (Q) components, are forwarded to RF interface circuitry 30 by DSP 40. RF interface circuitry 30 converts these digital data into analog signals, phase-shifts the selected converted bitstreams to provide both in-phase (I) and quadrature (Q) analog signal components, and applies analog filtering as appropriate to the signals to be handed off to modulator 27 in radio subsystem 22.

On the receive side, RF interface circuitry 30 converts the analog signal received by receiver 23 of radio subsystem 22 into the appropriate digital format for processing by DSP 40. For example, in-phase (I) and quadrature (Q) components of the received signal are separated and filtered. Analog to digital conversion is then carried out by RF interface circuitry 30, so that digital bitstreams corresponding to the separated and filtered components of the received signal may be received by DSP 40.

DSP 40 executes the appropriate digital signal processing upon both the signals to be transmitted and those received. In this regard, DSP 40 is coupled to network interface 34, which in turn couples base station 10 to the computer and communications network, including the Public Switched Telephone Network (PSTN). Network interface 34 is a conventional subsystem, including such functions as a physical layer interface and a network interface adapter, and selected according to the type of network and corresponding interface desired for base station 10.

The digital functions performed by DSP 40 will depend, of course, upon the communications protocol used by wireless base station 10. The functions shown in FIG. 2 for DSP 40 correspond to those functions as performed for each user currently communicating with base station 10; the functionality for only one user is shown in FIG. 2, for clarity. On the receive side, DSP 40 will digitally perform such functions as a rake receive function, identifying the user associated with each communication, channel decoding of the data from RF interface circuitry 30 to retrieve a data signal from the received digitally spread signal, followed by the decoding of the speech symbols from the channel decoded data using techniques such as inverse discrete Fourier transforms (IDFT) and the like, as illustrated in FIG. 2 by user and symbol detection and decode circuitry 50. Equalization, error correction, and decryption processes are also performed upon the received signal as appropriate. The resulting signal processed by DSP 40 on the receive side is then forwarded to network interface 34, to be forwarded to the appropriate network destination.

On the transmit side, the incoming voice communications from the PSTN, or other incoming data input in the 3G sense from the PSTN network, are forwarded to DSP 40 by network interface 34. Encode and modulate function 54 performs the appropriate digital processing functions for the particular protocol. For example, encode and modulate function 54 may first encode the received digital data into symbols, for example by way of a DFT operation,. These symbols are then spread, by way of a spreading code, into a sequence of chips, according to a selected chip rate; the spreading may also include the spreading of the symbols into multiple subchannels. According to the preferred embodiment of the invention, which will be described in further detail below, a cell-specific scrambling code is then applied to the spread symbols, and the scrambled spread symbols are modulated. In general, this modulation splits the subchannels into in-phase (I) and quadrature (Q) groups, so that the eventual modulated signal includes both components. The spread spectrum sequence is converted into an analog signal by RF interface 30, with the desired filtering and pre-equalization to compensate for channel distortion, and is then transmitted over antenna BSA by radio subsystem 22.

Other support circuitry is also provided within wireless base station 10 as shown in FIG. 2. In this example, controller 36 handles the control of wireless base station 10 other than the data path. Such control functions include resource management, operating system control, and control of the human interface; in this regard, controller 36 operates with such functions as memory 33 (for storage of the operating system and user preferences), keyboard 37, and user display 38.

Figure 3:
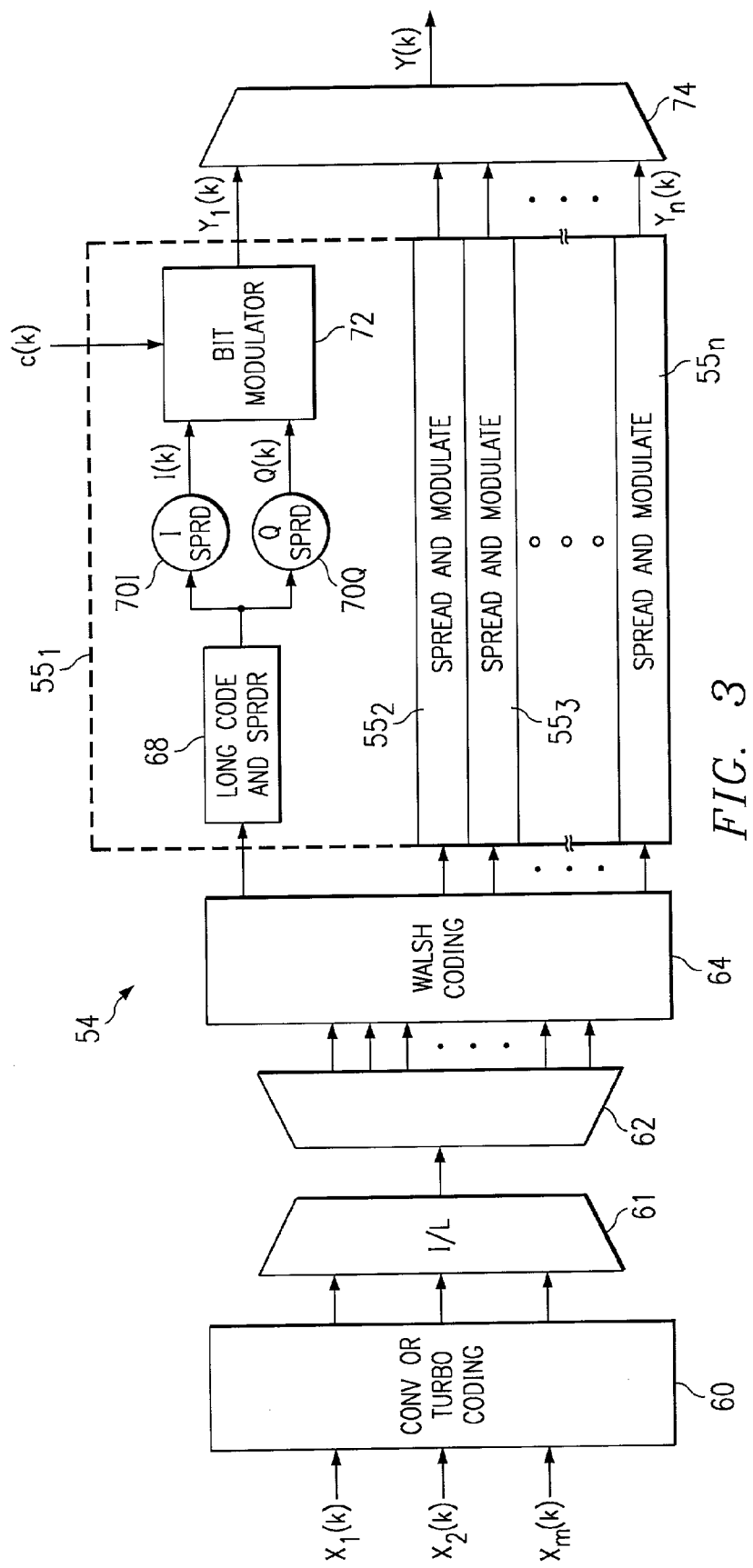
FIG. 3 is a functional diagram, in block form, of the operations involved in modulation of a data signal according to the preferred embodiment of the invention.

Referring now to FIG. 3, the functional construction and operation of encode and modulate function 54 will now be described. In the example of FIG. 2, in which encode and modulate function 54 is illustrated as contained within DSP 40, it is contemplated that these operations within encode and modulate function 54 can be carried out by the execution of software routines by DSP 40. Alternatively, it is also contemplated that some or all of these functions illustrated in FIG. 3 can be performed by dedicated hardware, such as custom or semi-custom logic circuits. The tradeoff between hardware and software realizations of these functions is contemplated to be within the skill and discretion of the artisan having reference to this specification.

Multiple datastreams X(k) are received by encode and modulate function 54, each datastream X(k) corresponding to one of multiple subchannels, each of which will be separately spread and encoded, as typical for broadband communications. Each data stream X(k) is applied to convolution coding function 60, also referred to as "turbo" coding, to insert redundancy into that subchannel for purposes of forward error correction. These streams are then multiplexed by interleaver 61, and then demultiplexed by demultiplexer 62 prior to application to Walsh coding function 64. As known in the art, Walsh coding function 64, as known in the art, multiplies the data stream by a spreading code (e.g., a Walsh code, or Walsh-Hadamard code) to spread each bit of bitstream x(k) into a modulated sequence of multiple "chips". In effect, Walsh coding function 64 converts each bit of its received data stream into a series of samples, or chips, modulated by the spreading code, so that the chip rate out of function 64 is a modulated multiple of the data rate of the input datastream, for each subchannel.

As shown in FIG. 3, the subchannel outputs of Walsh coding function 64 are each separately applied to a corresponding one of spread and modulate functions 55. In each spread and modulate function 55, a so-called "long" modulation code is then applied to the datastream by long code spreader 68. As known in the art, the "long" code is a modulation code that is selected in a pseudo-random manner, to greatly reduce the probability of a collision among multiple wireless units in a given coverage area. The spreading long code applied in function 68 is a "long" code, to ensure that multiple orthogonal communications can be carried out simultaneously within the cell.

The output of long code spreader function 68 is a sequence of digital words. This output sequence is applied to in-phase spread function 70I and to quadrature spread function 70Q, assigning some of the multiplexed data words to an in-phase (I) channel and some to a quadrature (Q) channel, as precursors to I and Q components, respectively, of a complex analog output signal. Often, specific subchannels are assigned to the I and Q components; for example, in a simple system, a data channel may be assigned to the in-phase component, while a control channel may be assigned to the quadrature component. More typically, multiple data subchannels are assigned to each of the I and Q channels. At this point in the encoding and modulation process, the I and Q channels are still sequences of digital words.

Data sequences I(k), Q(k), from the outputs of spread functions 70I, 70Q, respectively, are then applied to bit modulator 72. Bit modulator function 72 is either a software routine executable by DSP 40, or alternatively is dedicated logic circuitry, that combines these data sequences I(k), Q(k) with a cell-specific scrambling code c(k) to produce a modulated output sequence Y(k). The scrambled output sequence Y(k) can be resolved by the receiving element to distinguish these communications from those that may have been received from wireless units in other physical cells. Alternatively, the preferred embodiment of the invention may be used in connection with the modulation of complex digital words with other types of scrambling codes, and with other complex codes in general. The output of the spread and modulate functions 55 are then recombined by multiplexer 74 into an output datastream Y(k), and forwarded to RF interface 30 (FIG. 2) for transmission.

Figure 4:
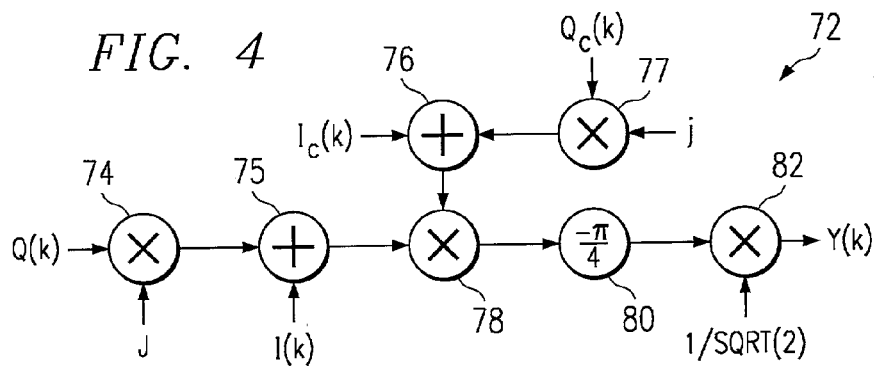
FIG. 4 is a data flow diagram of a technique for combining a complex data signal with a complex scrambling code according to the preferred embodiment of the invention.

Referring now to FIG. 4, the functional data flow of bit modulator 72 according to the preferred embodiment of the invention will now be described, relative to a mathematical representation of the operations performed on these datastreams. As noted above relative to FIG. 3, bit modulator 72 receives the data stream as in-phase component I(k) and quadrature component Q(k), and receives the scrambling code as in-phase component $I_c(k)$ and quadrature component $Q_c(k)$.

As shown in FIG. 4, quadrature data component Q(k) is placed into the complex domain by applying the imaginary operator j (i.e., $\sqrt{-1}$), via process 74. The imaginary quadrature component jQ(k) is added to in-phase component I(k), at adder 75, to produce a complex data value (i.e., with both real and imaginary components) that is applied to mixer 78. Similarly, the quadrature component $Q_c(k)$ of the scrambling code has the imaginary operator j applied thereto by process 77, and is added to the in-phase scrambling code component $I_c(k)$ at adder 76. The output of adder 76, which is a sequence $I_c(k)+jQ_c(k)$ of complex digital values corresponding to the scrambling code c(k), is applied to mixer 78, for combining with the complex data signal I(k)+jQ(k).

Mixer 78 then combines these complex data and scrambling code sequences I(k)+jQ(k) and $I_c(k)+jQ_c(k)$. For purposes of this mathematical model, mixer 78 corresponds to a complex multiplication operation. According to this embodiment of the invention, the output of mixer 78 is effectively rotated by a phase shift of –45°, or –π/4 radians, by process 80, and scaled by a factor of $1/\sqrt{2}$ by process 82. The phase-shifted and scaled output of process 82 is the complex, scrambled, data stream Y(k). This data stream Y(k) is the forwarded to RF interface 30 (FIG. 2), for filtering and application to the appropriate analog carriers for the signal to be transmitted.

It has been observed that phase shift process 80 applied to the combining of the complex data and scrambling code sequences I(k)+jQ(k) and $I_c(k)+jQ_c(k)$ in no way changes the signal to be transmitted. As is known in the art, the absolute phase of the transmitted signal is of no importance in QAM modulation; instead, the phase portion of the constellation is the phase of the current QAM sample relative to the previous sample. In other words, it is the relative phase difference between successive symbols that conveys the phase information in the transmitted signal. Accordingly, a phase shift of any arbitrary phase angle, applied to each complex data value in the transmitted sequence, in no way affects the data being transmitted.

The scaling of the amplitude of the transmitted complex data sequence, as applied by process 82, also does not reduce the information carried by the transmitted signal. Indeed, the amplitude of the signal may be compensated if desired, for example by an upscaling of the amplitude by a corresponding factor of $\sqrt{2}$, either before or preferably after bit modulator 72 of FIG. 4. Accordingly, the content of the transmitted information is also not affected by scaling process 82.

It has been found, according to this invention, that the effective combination of complex multiplier 78 with phase-rotation process 80 and scaling process 82 can be realized by a simple split adder, in which the data and scrambling code signals are added together in a bit-by-bit manner. This simple split adder architecture is much more efficient in combining the complex data and scrambling code signals than a conventional complex mixer, as discussed above.

Further, to the extent that this simple split adder inserts artifacts into the result, as compared to a true complex multiplication, are simply these artifacts, represented by phase rotation process 80 and scaling process 82 in FIG. 4, do not compromise the integrity of the signal to be transmitted in any way.

Consider the complex multiplication of complex numbers a+jb with c+jd. As is fundamental in complex arithmetic, this multiplication is carried out as follows:

$$(a+jb) \times (c+jd) = (ac-bd) + j(bc+ad)$$

In effect, this multiplication requires four multiplications and two subtractions. In contrast, according to the preferred embodiment of this invention, one can simplify the operations by adding phase rotation process 80 and scaling process 82 as follows:

$$\frac{1}{\sqrt{2}}[(ac-bd)+j(bc+ad)]e^{-j\frac{\pi}{4}} = (a+c)+j(b+d)$$

These operations are performed in a bit-by-bit manner in the wireless communications application described above. However, in the application of bit modulator 72, because the phase rotation and scaling are either irrelevant or can be compensated, the complex mixing of the data and scrambling code datastreams can be carried out by two simple additions per bit position.

Figure 5:
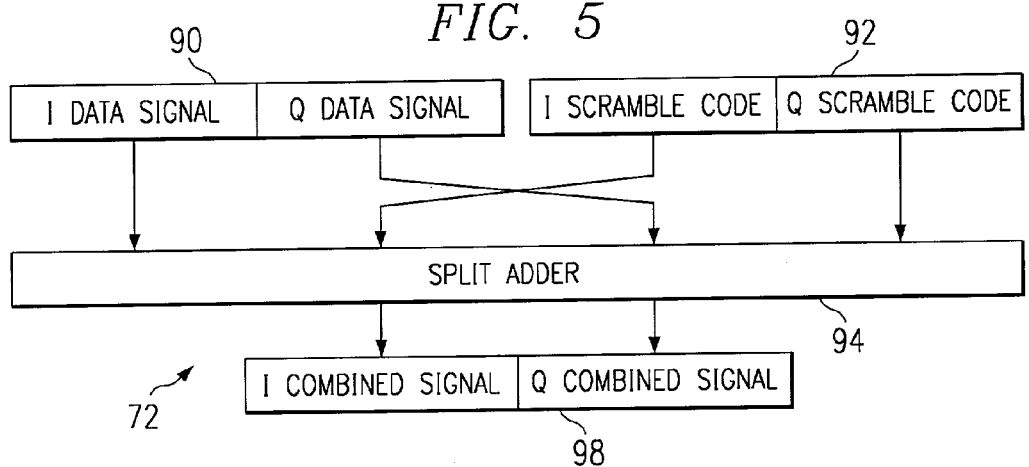
FIG. 5 is an electrical diagram, in block form, of a split adder architecture for performing the complex mixing operation according to the preferred embodiment of the invention.
Figure 6:
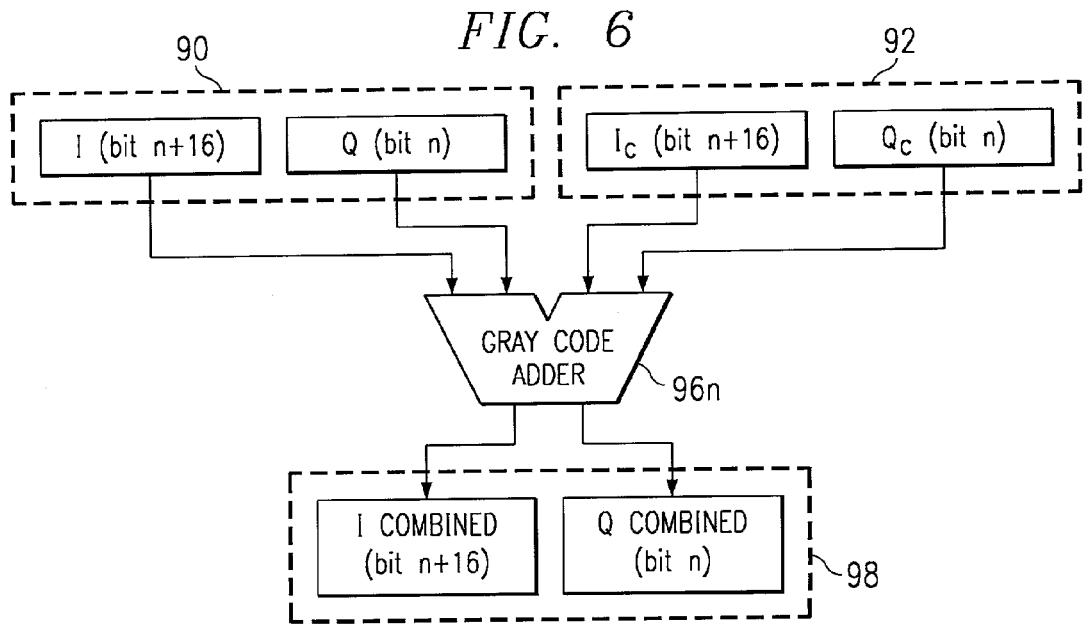
FIG. 6 is an electrical diagram, in block form, of one stage of the split adder architecture of FIG. 5, according to the preferred embodiment of the invention.

The split adder architecture of bit modulator 72, in which the real and imaginary parts are added in a bit-by-bit manner, will now be described relative to FIGS. 5 and 6. FIG. 5 shows bit modulator 72 as realized by split adder 94, which receives inputs from registers 90, 92, and presents an output to register 98. In this example, split adder 94 is a thirty-two bit split adder, for adding thirty-two bit data words from registers 90, 92 and presenting a thirty-two bit data word to register 98.

In this example, register 90 stores in-phase data component I(k) of the payload in a most significant position, and stores payload quadrature component Q(k) in a least significant position. Similarly, in-phase and quadrature components $I_c(k)$, $Q_c(k)$, respectively, of the scrambling code are stored in most significant and least significant positions, respectively, of register 92. Similarly, output register 98 is a thirty-two bit register for storing the combination of the data and scramble codes, with the in-phase portion occupying the sixteen most significant bits, and the quadrature portion occupying the sixteen least significant bits. The contents of register 98 thus represent a sample of output sequence Y(k), having an in-phase component $I_Y(k)$ in its most significant portion and a quadrature component $Q_Y(k)$ in its least significant portion. The contents of register 98 are then forwarded to RF interface 30 (FIG. 2), for conversion into the analog domain, filtering, rescaling to compensate for the scaling effectively applied by split adder 94 if desired, and analog modulation of the corresponding subcarriers.

In this example, split adder 94 is realized by way of sixteen two-bit Gray Code adders. FIG. 6 illustrates one such two-bit Gray Code adder 96n. In this example, adder 96n receives a two-bit digital value from register 90 and a two-bit digital value from register 92. The most significant bit of the two-bit value from register 90 is bit n+16 of register 90, which corresponds to bit n of the in-phase data component I(k), and the least significant bit is bit n from register 90, which corresponds to bit n of quadrature data component Q(k). The most significant bit of the two-bit value from register 92 is bit n+16 of register 92, which corresponds to bit n of the in-phase scrambling code $I_c(k)$, and the least significant bit is bit n from register 92, which corresponds to one bit of quadrature scrambling code $Q_c(k)$.

Adder 96n performs a Gray Code addition of these two two-bit digital values; any carry out or overflow of this sum is ignored. As is well known in the art, the Gray Code representation of $10_2$ is 11, and the Gray Code representation of $11_2$ is 10. Accordingly, the input two-bit values from registers 90, 92 are considered as Gray Code values, and summed to produce a Gray Code value. The least significant bit of the two-bit output of adder 96n is stored in bit n of register 98, to correspond to bit n of combined quadrature output signal $Q_y(k)$, while the most significant bit of the output of adder 96n is stored in bit n+16 of register 98, to correspond bit n of combined in-phase output signal $I_y(k)$. As noted above with reference to FIG. 5, this operation is repeated sixteen times within split adder 94, resulting in a sixteen bit word representative of combined in-phase output signal $I_y(k)$ in the most significant portion of register 98, and a sixteen bit word representative of combined quadrature output signal $Q_y(k)$, stored in the least significant portion of register 98.

Figure 1:
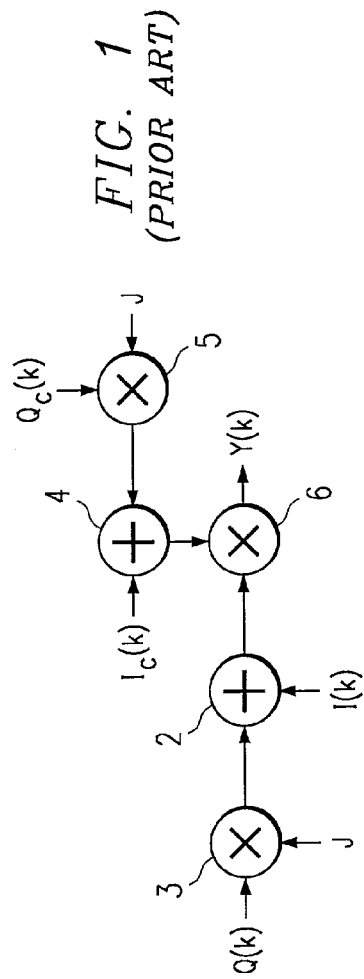
FIG. 1 is a data flow diagram of a conventional technique for combining a complex data signal with a complex scrambling code, as used in conventional QAM modulation.

Table I illustrates the operation of the preferred embodiment of the invention, for a bit position n in registers 90, 92, in comparison with a corresponding complex multiplication as performed by conventional mixer 6 (FIG. 1). In this example, the phase rotation corresponding to process 80 and the scaling of process 82 of FIG. 5 is effected by considering the digital values 0 and 1 to represent +1 and −1, respectively. The scaled and rotated sum, relative to the output of conventional mixer 6 is also given, for reference.

carried out by way of sixteen two-bit adds, rather than by sixteen complex multiplications. This simple execution of the bit modulation process can be rapidly performed in software, for example by a modern DSP device, or alternatively by very simple dedicated hardware arranged as banks of two-bit adders.

Considering the cumbersome nature of conventional complex multiplication, and its effects on the digital modulation of broadband communications signals, it is contemplated that the present invention can eliminate a significant bottleneck in such transmissions. Rather than several cycles being required to carry out a single modulation of a data word and its scrambling code, it is contemplated that the present invention can enable several modulations to be carried out even within a single cycle. The incorporation of a specific instruction for this operation, executable by a DSP or other programmable device, is contemplated to be a particularly efficient way of implementing this invention as executable software. In any event, the improvements provided by this invention are expected to provide a corresponding improvement in the performance of wireless unit 10 (FIG. 2), and any other type of digital radio device that incorporates this invention.

It is contemplated that many variations on the implementation of the preferred embodiment of the invention will be apparent to those skilled in the art having reference to this specification. For example, it is contemplated that the particular order of the bits described above is not essential; instead, other split adder mechanisms for effectively performing the complex multiplication on different bit orders and the like, and that do not result in loss of information

TABLE I

| IQ | $I_cQ_c$ | Conventional mixer output | Scaled Sum (rotated) | Register 98, bit n+16 ($I_y$): | Register 98, bit n (Qy): | Gray Code sum (mod4) |
|---|---|---|---|---|---|---|
| 00(1+j) | 00(1+j) | 0+2j | 1+j | 0 | 0 | 00 |
| 00(1+j) | 01(1−j) | 2+0j | 1−j | 0 | 1 | 01 |
| 00(1+j) | 11(−1−j) | 0−2j | −1−j | 1 | 1 | 11 |
| 00(1+j) | 10(−1+j) | −2+0j | −1+j | 1 | 0 | 10 |
| 01(1−j) | 00(1+j) | 2+0j | 1−j | 0 | 1 | 01 |
| 01(1−j) | 01(1−j) | 0−2j | −1−j | 1 | 1 | 11 |
| 01(1−j) | 11(−1−j) | −2+0j | −1+j | 1 | 0 | 10 |
| 01(1−j) | 10(−1+j) | 0+2j | 1+j | 0 | 0 | 00 |
| 11(−1−j) | 00(1+j) | 0−2j | −1−j | 1 | 1 | 11 |
| 11(−1−j) | 01(1−j) | −2+0j | −1+j | 1 | 0 | 10 |
| 11(−1−j) | 11(−1−j) | 0+2j | 1+j | 0 | 0 | 00 |
| 11(−1−j) | 10(−1+j) | 2+0j | 1−j | 0 | 1 | 01 |
| 10(−1+j) | 00(1+j) | −2+0j | −1+j | 1 | 0 | 10 |
| 10(−1+j) | 01(1−j) | 0+2j | 1+j | 0 | 0 | 00 |
| 10(−1+j) | 11(−1−j) | 2+0j | 1−j | 0 | 1 | 01 |
| 10(−1+j) | 10(−1+j) | 0−2j | −1−j | 1 | 1 | 11 |

As evident from Table I, each resulting output point from adder 94 corresponds to a point on the ±45° axes, while each point output by conventional mixer 6 is on either the real axis or the imaginary axis. In addition, the representation of 0 and 1 by −1 and +1, respectively, effectively scales the magnitude of the sum by a factor of $\sqrt{2}$, considering that each point output by conventional mixer 6 has a magnitude of 2. As noted above, this scaling can be compensated by applying a gain stage downstream from split adder bit modulator 72, if desired.

Because, as noted above, the rotation and scaling effected by split adder 94 serving as bit modulator 72 can be either ignored or compensated, the combining of the datastream and scrambling code can be performed very quickly and efficiently, according to the preferred embodiment of the invention. In the illustrated example, the bit modulation is from the payload, can be readily derived. In this regard, it is particularly contemplated that the bit order of the modulated output data word (i.e., Y(k)) may be scrambled or mixed, of course in a manner that is also known by the receiving device so that retrieval of the signal may be accomplished. In addition, it is of course contemplated that different digital word sizes, from the sixteen-bit sized described above, may be used in connection with this invention.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A digital system for digitally modulating a datastream of digitally-represented complex values with a complex code, comprising:
   a first register for storing a data in-phase component value of the datastream and a corresponding data quadrature component value of the datastream;
   a second register for storing a code in-phase component value and a corresponding code quadrature component value;
   split adder circuitry for adding, for each of a plurality of bits, a digital data word including a bit of the data in-phase component value and a corresponding bit of the data quadrature component value with a digital code word including corresponding bit of the code in-phase component value arid a corresponding bit of the code quadrature component value;
   an output register, coupled to the adder circuitry, for storing results of the adding as a combined in-phase component value and a combined quadrature component value; and
   wherein the adder circuitry comprises a plurality of Gray Code adders, each Gray Code adder associated with one bit position of the respective data and code in-phase and quadrature component values, and having first and second data outputs coupled to corresponding bit positions of the output register.

2. The system of claim 1, further comprising:
   circuitry for separating the in-phase and quadrature component values from the datastream.

3. The system of claim 1, wherein the first register has a most significant portion for storing the data in-phase component value, and has a least significant portion for storing the corresponding data quadrature component value;
   and wherein the second register has a most significant portion for storing the code in-phase component value and has a least significant portion for storing the code quadrature component value.

4. The system of claim 3, wherein the output register has a most significant portion for storing the combined in-phase component value, and has a least significant portion for storing the combined quadrature component value.

5. A method of modulating a spread-spectrum datastream with a scrambling code, comprising the steps of:
   receiving a datastream of digital values representing in-phase data values and corresponding quadrature data values;
   receiving a scrambling code of digital values representing in-phase code values and corresponding quadrature code values;
   for each of the bits in the datastream, adding a digital data word of corresponding bits in the in-phase and quadrature data values with a digital code word of corresponding bits of the in-phase and quadrature code values, to produce an in-phase combined bit value and a quadrature combined bit value;
   generating a quadrature amplitude modulation signal corresponding to the result of the adding step; and
   wherein the adding step comprises:
   Gray Code adding the digital data word and the digital code word;
   storing the data output bits from the Gray Code adding step in corresponding bit positions of an output register.

6. The method of claim 5, further comprising:
   receiving an input sequence of digital payload values;
   demultiplexing the input sequence into a plurality of subchannels;
   spreading each of the plurality of subchannels into spread-spectrum bitstreams;
   recombining the spread-spectrum bitstreams into a datastream;
   separating the datastream into an in-phase datastream and a quadrature datastream.

7. The method of claim 6, further comprising:
   applying a long code to the datastream.

8. The method of claim 5, further comprising:
   after the adding step, scaling the magnitude of the digital word represented by the in-phase and quadrature combined bit values.

9. A digital communications base station, comprising:
   a radio subsystem for amplifying modulated signals for transmission over an antenna;
   a radio frequency interface circuit, coupled to the radio subsystem, for converting digital signals into analog signals for transmission;
   network interface circuitry, coupled to a communications network, for generating a digital input sequence corresponding to a data signal to be forwarded to a remote user;
   digital circuitry, coupled to the network interface circuitry and to the radio frequency interface circuit, the digital circuitry for modulating the received digital input sequence into a spread-spectrum digital datastream having in-phase and quadrature data components, the digital circuitry having a circuit for applying a scrambling code having in-phase and quadrature code components to the spread-spectrum datastream by adding, for each of a plurality of bits, a digital data word including a bit of the in-phase data component value and a corresponding bit of the quadrature data component value with a digital code word including corresponding bit of the in-phase code component value and a corresponding bit of the quadrature code component value to forward a combined digital word having in-phase and quadrature components to the radio frequency interface circuit; and
   wherein the addition performed by the digital circuitry provides an equivalent digital signal as a complex multiplication of the having in-phase and quadrature data components with the in-phase and quadrature code components in combination with a phase shift and amplitude scaling.

10. The base station of claim 9, wherein the digital circuitry comprises a digital signal processor;
    and wherein the addition is performed by the digital signal processor executing a software routine specifying the addition.

11. The base station of claim 10, wherein the software routine comprises at least one instruction dedicated to the addition.

12. The base station of claim 9, wherein the digital circuitry comprises a split adder comprising:
    a plurality of Gray Code adders, each for performing a two-bit Gray Code addition of a two-bit Gray Code value corresponding to a bit of the in-phase data value and a corresponding bit of the quadrature data value with a corresponding two-bit Gray Code value corresponding to a bit of the in-phase code value and a corresponding bit of the quadrature code value, to produce a two-bit Gray Code value corresponding to a combined in-phase component bit and a combined quadrature component bit.

* * * * *